United States Patent
Xioa et al.

(10) Patent No.: US 11,210,020 B2
(45) Date of Patent: Dec. 28, 2021

(54) METHODS AND SYSTEMS FOR ACCESSING A MEMORY

(71) Applicant: Huawei Technologies Co., Ltd., Shenzhen (CN)

(72) Inventors: Shihai Xioa, Moscow (RU); Qiaosha Zou, Shenzhen (CN); Wei Yang, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/414,383

(22) Filed: May 16, 2019

(65) Prior Publication Data

US 2019/0272122 A1 Sep. 5, 2019

Related U.S. Application Data

(63) Continuation of application No. PCT/CN2016/106130, filed on Nov. 16, 2016.

(51) Int. Cl.
*G06F 3/06* (2006.01)
*G06F 12/0891* (2016.01)
(Continued)

(52) U.S. Cl.
CPC .......... *G06F 3/0659* (2013.01); *G06F 3/0604* (2013.01); *G06F 3/064* (2013.01);
(Continued)

(58) Field of Classification Search
CPC .... G06F 3/0659; G06F 12/0888; G06F 12/08; G06F 12/0879; G06F 3/0604;
(Continued)

(56) References Cited

U.S. PATENT DOCUMENTS

| | | | |
|---|---|---|---|
| 6,487,640 B1 | 11/2002 | Lipasti | |
| 2001/0008009 A1* | 7/2001 | Johnson | G06F 12/0864 |
| | | | 711/128 |

(Continued)

FOREIGN PATENT DOCUMENTS

| CN | 101201800 A | 6/2008 |
|---|---|---|
| CN | 101266578 A | 9/2008 |

(Continued)

OTHER PUBLICATIONS

Zhao, Li, et al. "Exploring DRAM cache architectures for CMP server platforms." 2007 25th International Conference on Computer Design. IEEE, 2007. (Year: 2007).*

(Continued)

*Primary Examiner* — Francisco A Grullon
(74) *Attorney, Agent, or Firm* — Conley Rose, P.C.

(57) ABSTRACT

A memory access technology applied to a computer system includes a first-level memory, a second-level memory, and a memory controller. The first-level memory is configured to cache data in the second-level memory. A plurality of access requests for accessing different memory blocks has a mapping relationship with a first cache line in the first-level memory, and the memory controller compares tags of the plurality of access requests with a tag of the first cache line in a centralized manner to determine whether the plurality of access requests hit the first-level memory.

20 Claims, 6 Drawing Sheets

(51) Int. Cl.
*G06F 12/0888* (2016.01)
*G06F 12/08* (2016.01)
*G06F 12/0879* (2016.01)
*G06F 12/0895* (2016.01)

(52) U.S. Cl.
CPC ............ *G06F 3/0673* (2013.01); *G06F 12/08* (2013.01); *G06F 12/0879* (2013.01); *G06F 12/0888* (2013.01); *G06F 12/0891* (2013.01); *G06F 12/0895* (2013.01); *G06F 2212/1024* (2013.01); *G06F 2212/202* (2013.01); *G06F 2212/608* (2013.01)

(58) Field of Classification Search
CPC .... G06F 3/064; G06F 3/0673; G06F 12/0891; G06F 2212/202; G06F 2212/1024; G06F 12/0895; G06F 2212/608
See application file for complete search history.

(56) References Cited

U.S. PATENT DOCUMENTS

| | | | | |
|---|---|---|---|---|
| 2005/0144388 | A1* | 6/2005 | Newburn | G06F 12/0886 711/118 |
| 2009/0006756 | A1 | 1/2009 | Donley | |
| 2013/0179640 | A1* | 7/2013 | Aggarwal | G06F 12/0864 711/136 |
| 2014/0032845 | A1* | 1/2014 | Avudaiyappan | G06F 12/0846 711/122 |
| 2014/0156947 | A1 | 6/2014 | Avudaiyappan et al. | |
| 2016/0147666 | A1* | 5/2016 | Li | G06F 12/0897 711/122 |
| 2016/0147669 | A1 | 5/2016 | Huang et al. | |
| 2016/0283392 | A1* | 9/2016 | Greenfield | G06F 12/128 |
| 2016/0335177 | A1 | 11/2016 | Huang et al. | |
| 2016/0335187 | A1* | 11/2016 | Greenspan | G06F 12/128 |
| 2016/0350230 | A1* | 12/2016 | Murphy | G11C 11/4096 |
| 2017/0091093 | A1* | 3/2017 | Wang | G06F 3/0685 |
| 2018/0046579 | A1* | 2/2018 | Greenspan | G06F 12/128 |
| 2020/0226068 | A1* | 7/2020 | Gellerich | G06F 12/0891 |

FOREIGN PATENT DOCUMENTS

| | | |
|---|---|---|
| CN | 101355583 A | 1/2009 |
| CN | 101896891 A | 11/2010 |
| CN | 103198026 A | 7/2013 |
| CN | 104346293 A | 2/2015 |
| CN | 104809076 A | 7/2015 |
| CN | 105138587 A | 12/2015 |
| CN | 105786400 A | 7/2016 |
| CN | 105938458 A | 9/2016 |

OTHER PUBLICATIONS

Liang, Yun, and Tulika Mitra. "Improved procedure placement for set associative caches." Proceedings of the 2010 international conference on Compilers, architectures and synthesis for embedded systems. 2010. (Year: 2010).*
Machine Translation and Abstract of Chinese Publication No. CN101266578, Sep. 17, 2008, 12 pages.
Machine Translation and Abstract of Chinese Publication No. CN101355583, Jan. 28, 2009, 8 pages.
Machine Translation and Abstract of Chinese Publication No. CN105138587, Dec. 9, 2015, 83 pages.
Foreign Communication From A Counterpart Application, PCT Application No. PCT/CN2016/106130, English Translation of International Search Report dated Aug. 16, 2017, 2 pages.
Foreign Communication From A Counterpart Application, PCT Application No. PCT/CN2016/106130, English Translation of Written Opinion dated Aug. 16, 2017, 4 pages.
Ashok, R., et al., "Coupling Compiler-Enabled and Conventional Memory Accessing for Energy Efficiency," XP1192961, ACM Transactions on Computer Systems, vol. 22, No. 2, May 2004, pp. 180-213.
Foreign Communication From a Counterpart Application, Chinese Application No. 16921537.3, Extended European Search Report dated Oct. 2, 2019, 11 pages.

* cited by examiner

|  | Request type | Hit status | Operation |
|---|---|---|---|
| Access request not in a second access set | Read | Hit | Access DRAM |
|  | Read | Miss | Access NVM |
|  | Write | Hit | Access NVM |
|  | Write | Miss | Access NVM |
| Access request in the second access set | Read | Hit | Access DRAM |
|  | Read | Miss | Access NVM |
|  | Write | Hit | Access DRAM |
|  | Write | Miss | Access DRAM |

FIG. 6

| Request type | Cache hit status | Information about a cache line | | |
|---|---|---|---|---|
|  |  | Dirty | Tag | Data |
| Read request | Hit | Do not update | Do not update | Do not update |
| Read request | Miss | 0 | Update | Update |
| Write request | Hit | 1 | Do not update | Update |
| Write request | Miss | 1 | Update | Update |

FIG. 7

METHODS AND SYSTEMS FOR ACCESSING A MEMORY

CROSS-REFERENCE TO RELATED APPLICATIONS

This application is a continuation of International Application No. PCT/CN2016/106130, filed on Nov. 16, 2016, the disclosure of which is hereby incorporated by reference in its entirety.

TECHNICAL FIELD

The present disclosure relates to the field of storage technologies, and in particular, to a memory access technology.

BACKGROUND

With development of technologies, a non-volatile memory (NVM) such as a phase change memory (PCM) is applied more widely. An NVM can still store data after a system is powered off, and has advantages such as high density and desirable scalability. Therefore, the NVM is gradually used as a memory.

In an existing hybrid memory architecture, a dynamic random access memory (DRAM) and an NVM may be used together as a memory of a computer system. However, because an access rate of the NVM is lower than an access rate of the DRAM, the DRAM is usually used as a cache of the NVM. In other words, the NVM is used as a main memory, and the DRAM is used as a cache of the main memory NVM. In this architecture, when receiving a memory access request, a memory controller first determines whether a to-be-accessed address in the memory access request hits the DRAM, to determine whether the to-be-accessed data is stored in the DRAM. When determining that the to-be-accessed address hits the DRAM, the memory controller may directly read the to-be-accessed data from the DRAM to shorten access latency. The memory controller obtains the to-be-accessed data from the NVM only when determining that the to-be-accessed address misses the DRAM.

SUMMARY

Embodiments of this application provide a memory access technology that can improve memory access efficiency.

According to a first aspect, this application provides a memory access method applied to a computer system. The computer system includes a first-level memory, a second-level memory, and a memory controller connected to the first-level memory and the second-level memory. The first-level memory is configured to cache data in the second-level memory. When processing memory access requests, after determining a first access set including a plurality of access requests, the memory controller obtains a tag in a target address of each access request in the first access set. The plurality of access requests are respectively used to access a plurality of different memory blocks in the second-level memory, the plurality of memory blocks have a mapping relationship with a first cache line in the first-level memory, and the tag in the target address of each access request is used to indicate a location of a to-be-accessed memory block in the second-level memory. After reading information about the first cache line from the first-level memory, the memory controller compares the tag in the target address of each access request in the first access set with a tag of the first cache line to determine whether each access request hits the first-level memory. The information about the first cache line includes the tag of the first cache line.

In the memory access method provided in this application, for a plurality of access requests (namely, the plurality of access requests in the first access set) for accessing different memory blocks having a mapping relationship with the first cache line, the memory controller may compare tags of the plurality of access requests with the tag of the first cache line in a centralized manner. In this process, the memory controller can complete comparison with the tags of the plurality of access requests by reading the tag of the cache line from the first-level memory only once, thereby reducing a quantity of times of reading the tag of the first cache line from the first-level memory, shortening latency of reading the tag of the cache line from the first-level memory, and improving memory access efficiency.

Further, in the memory access method provided in this application, the memory controller may further determine some access requests in the first access set to form a second access set. In addition, the memory controller updates the information about the first cache line based only on a request type of an access request in the second access set and whether the access request in the second access set hits the first-level memory. In this manner, for a plurality of access requests for accessing a same cache line, in the memory access method provided in this application, information about the cache line may be updated based only on some of the access requests, rather than based on whether each access request hits a cache. Therefore, the memory access method provided in this application can reduce an update time of a cache line, and shorten access latency of a memory access request, thereby further improving the memory access efficiency.

In a possible implementation, the updating the information about the first cache line includes updating the tag of the first cache line based on a tag in a target address of a first access request. In an actual application, the updating the information about the first cache line may further include updating information of at least one item of a valid bit, a dirty bit, and a data bit of the first cache line.

In another possible implementation, during update of the information about the first cache line, if a current dirty bit of the first cache line indicates that data cached in the first cache line is new data, the data cached in the first cache line is first written to the second-level memory before the update of the information about the first cache line. In this manner, correctness of data can be ensured.

In a possible implementation, the memory controller may determine the first access set based on a set index bit and a tag bit in a target address of each access request in an access queue. The set index bit is used to indicate a cache set to which a memory block that a target address of the access request points to is mapped in the first-level memory. The tag bit is used to indicate a location, in the second-level memory, of the memory block that the target address of the access request points to.

In another possible implementation, the memory controller may compare a tag in a target address of another access request in the first access set but not in the second access set with the tag of the first cache line to determine whether the another access request hits the first-level memory, and then the memory controller compares a tag in a target address of the access request in the second access set with the tag of the first cache line to determine whether the access request in the second access set hits the first-level memory. This manner does not affect a probability that another access request not in the second access set hits the first cache line. In other words, this memory access method does not reduce a cache hit rate. In addition, cached data in the first-level memory can be effectively replaced by updating the information about the first cache line based on the access request in the second access set, to increase a probability that a subsequent access request hits the first-level memory.

In another possible implementation, when a first access request in the second access set misses the first-level memory and the first access request is a write request, the memory controller writes to-be-written data carried in the first access request to the first-level memory. In the memory access method provided in this application, for a write request that is in the second access set and that is used to update the first cache line, even when the write request misses the first-level memory, to-be-written data can still be directly written to the first-level memory, so that the information about the first cache line can be updated, and access can be completed rapidly, thereby reducing access latency.

In another possible implementation, when a second access request of the plurality of access requests hits the first-level memory and the second access request is a write request, the memory controller sends the second access request to the second-level memory for processing, where the second access request does not belong to the second access set. In other words, for the second access request that does not belong to the second access set, because the first cache line is not updated based on the second access request, even when the second access request is a write request that hits the first-level memory, the memory controller can still directly send the second access request to the second-level memory for processing, so that to-be-written data in the second access request can be directly written to the second-level memory. However, in the prior art, in this case, the to-be-written data is written to the first-level memory, and then the data is written from the first-level memory to the second-level memory during subsequent persistence of data in the first-level memory. It can be learned that according to the memory access method of this application, during processing of an access request for which the first cache line does not need to be updated, to-be-written data may be directly written to the second-level memory, thereby reducing a quantity of times of data writing. Further, in this case, because the memory controller directly writes the to-be-written data in the second access request to the second-level memory, data of the first cache line in the first-level memory is already inconsistent with data of a memory block in the second-level memory. Therefore, the memory controller sets a valid bit in the information about the first cache line to an invalid state, where the invalid state is used to indicate that the data in the first cache line is unavailable.

In another possible implementation, the memory controller determines, based on the invalid state of the first cache line, that a third access request in the second access set misses the first-level memory. In other words, when comparing tags to determine whether an access request hits the first-level memory, the memory controller first determines whether the valid bit in the first cache line indicates that the data in the first cache line is valid. When the valid bit in the first cache line indicates that the data in the first cache line is invalid, it may be directly determined that the access request misses the first-level memory. Only when determining that the valid bit in the first cache line indicates that the data in the first cache line is valid, the memory controller determines, based on a tag comparison result, whether the access request hits the first-level memory. In this manner, the memory access efficiency can be improved to some extent.

According to a second aspect, an embodiment of this application provides a computer system. The computer system includes a first-level memory, a second-level memory, and a memory controller connected to the first-level memory and the second-level memory. The first-level memory is configured to cache data in the second-level memory. The memory controller is configured to perform the memory access method in the first aspect and possible implementations of the first aspect.

According to a third aspect, an embodiment of this application provides a memory controller. The memory controller is applied to a computer system. The computer system includes a first-level memory, a second-level memory, and the memory controller connected to the first-level memory and the second-level memory. The first-level memory is configured to cache data in the second-level memory. The memory controller includes modules configured to perform the memory access method in the first aspect or any possible implementation of the first aspect.

According to a fourth aspect, this application provides a computer program product, including a computer readable storage medium storing program code, where an instruction included in the program code is used to perform at least one memory access method in the first aspect or any possible implementation of the first aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure.

FIG. 6 is a schematic diagram of processing of an access request according to an embodiment of the present disclosure.

FIG. 7 is a schematic diagram of update of a cache line according to an embodiment of the present disclosure.

DESCRIPTION OF EMBODIMENTS

To make a person skilled in the art understand the technical solutions in the present disclosure better, the following describes the technical solutions in the embodiments of the present disclosure with reference to the accompanying drawings in the embodiments of the present disclosure. The described embodiments are merely some rather than all of the embodiments of the present disclosure.

Figure 1:
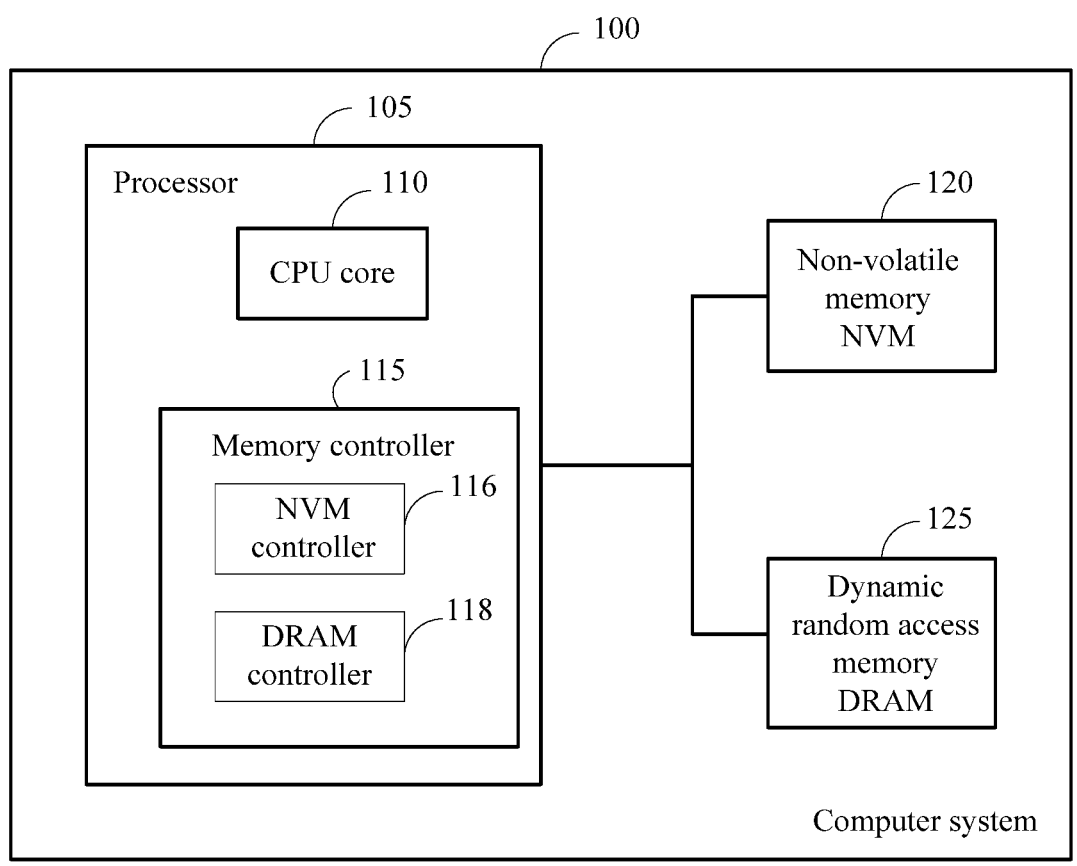
FIG. 1 is a schematic structural diagram of a computer system according to an embodiment of the present disclosure.

FIG. 1 is a schematic structural diagram of a computer system according to an embodiment of the present disclosure. As shown in FIG. 1, the computer system 100 may include at least a processor 105, a memory controller 115, a NVM 120, and a DRAM 125. Both the DRAM 125 and the NVM 120 are memories of the computer system 100. It may be understood that the computer system shown in FIG. 1 is merely an example of a computer system with a hybrid memory architecture, and the DRAM 125 and the NVM 120 shown in FIG. 1 are merely an example of multiple levels of memories in the computer system. In an actual application, an internal structure of the computer system is not specifically limited, and the computer system may further include another memory in addition to the DRAM 125 and the NVM 120, provided that the computer system in this embodiment of the present disclosure includes a first-level memory and a second-level memory that can be used as memories. The first-level memory can support high-speed cache access, provided that the computer system in this embodiment of the present disclosure includes at least two levels of memories. A first-level memory is a cache of a second-level memory and is configured to cache some data in the second-level memory. The computer system with a hybrid memory architecture provided in this embodiment of the present disclosure is described below by using FIG. 1 as an example.

The processor 105 is a core of the computer system 100. The processor 105 may invoke different software programs in the computer system 100 to implement different functions. For example, the processor 105 can implement access to the DRAM 125 and the NVM 120. It may be understood that the processor 105 may be a central processing unit (CPU). In addition to the CPU, the processor may further be another application-specific integrated circuit (ASIC), or be configured as one or more integrated circuits for implementing embodiments of the present disclosure. For ease of description, one processor is used as an example in this embodiment of the present disclosure. In an actual application, the computer system may include a plurality of processors. In addition, the processor may be a single-core processor, or may be a multi-core processor. In a multi-core processor architecture, the processor may include a plurality of processor cores. For example, as shown in FIG. 1, the processor 105 may include one or more CPU cores 110. A quantity of processors and a quantity of processor cores in one processor are not limited in this embodiment of the present disclosure.

The memory controller 115 is an important component in the computer system 100 for memory control and data exchange between the memory and the processor 105 (for example, a CPU). In an actual application, in a case, the memory controller 115 may be located in a northbridge chip. In another case, the memory controller 115 may be integrated in the processor 105 (as shown in FIG. 1). The memory controller 115 may be integrated on a substrate of the processor 105. When the memory controller 115 is located in a northbridge chip, the memory controller exchanges data with the processor by using the northbridge chip, resulting in relatively long data latency. When the memory controller 115 is integrated in the processor 105, the memory controller 115 may directly exchange data with the processor.

As shown in FIG. 1, the memory controller 115 may be coupled to an NVM controller 116 and a DRAM controller 118. The DRAM controller 118 is configured to control access to the DRAM 125. The NVM controller 116 is configured to control access to the NVM 120. The NVM controller 116 and the DRAM controller 118 may also be referred to as a medium controller. In an actual application, in a case, the NVM controller 116 and the DRAM controller 118 may be independent of the memory controller 115. In another case, the NVM controller 116 and the DRAM controller 118 may be integrated in the memory controller 115, logically as a part of the memory controller 115 (as shown in FIG. 1). In this embodiment of the present disclosure, the memory controller 115 may be connected to the NVM 120 and the DRAM 125 by using a memory bus (for example, a double data rate (DDR) bus). It may be understood that in an actual application, the NVM controller 116 may further communicate with the NVM 120 by using another type of bus such as a PCI high-speed bus or a desktop management interface (DMI) bus.

As described above, in the computer system shown in FIG. 1, the DRAM 125 may be connected to the processor 105 by using a memory bus. The DRAM 125 has an advantage of a high access speed. The processor 105 can access the DRAM 125 at a high speed, to perform a read or write operation on the DRAM 125. Usually, the DRAM 125 is configured to store various software that runs on an operating system, input and output data, information exchanged with an external memory, or the like. However, the DRAM 125 is volatile. When a power supply is turned off, information in the DRAM 125 is no longer stored.

Because a novel NVM can be addressed based on a byte and data is written to the non-volatile memory in bits, the NVM can be used as a memory. In this embodiment of the present disclosure, the NVM 120 may be used together with the DRAM 125 as the memory of the computer system 100. Compared with the DRAM 125, the NVM 120 has features of non-volatility, and therefore can store data better. In this embodiment of the present disclosure, a non-volatile memory that can be used as a memory may be referred to as a storage class memory (SCM).

It should be noted that the DRAM is a volatile memory. In an actual application, another random access memory (RAM) may be used as the memory of the computer system. For example, a static random access memory (SRAM) may be used as the memory of the computer system. In this embodiment of the present disclosure, the NVM 120 shown in FIG. 1 may include a novel non-volatile memory such as a PCM, a resistive random access memory (RRAM), a magnetic random access memory (MRAM), or a ferroelectric random access memory (FRAM). A specific type of the NVM is not limited in this embodiment of the present disclosure.

Compared with the DRAM 125, the NVM 120 has a lower access speed. Therefore, the NVM 120 is usually used as a main memory of the system, and the DRAM 125 is used as a cache of the NVM 120 to compensate for a disadvantage of a low access speed of the main memory NVM 120 and increase a memory access speed. As shown in FIG. 1, in the computer system shown in FIG. 1, the DRAM 125 is used as a cache of the NVM 120. When receiving a memory access request sent by the processor 105, the memory controller 115 first determines whether a to-be-accessed address in the memory access request hits the DRAM 125, to determine whether the to-be-accessed data is stored in the DRAM 125. When determining that the to-be-accessed address hits the DRAM 125, the memory controller 115 may directly read the to-be-accessed data from the DRAM 125 to shorten access latency. The memory controller 115 obtains the to-be-accessed data from the NVM 120 only when determining that the to-be-accessed address misses the DRAM 125.

Because the cache has a small capacity, content stored in the cache is just a subset of content in the main memory, and the cache exchanges data with the main memory in blocks. To cache data in the main memory to the cache, a main memory address is located in the cache by applying a function. This process is referred to as address mapping. After the data in the main memory is cached to the cache based on this mapping relationship, the CPU converts the main memory address in the program into a cache address when executing a program. A cache address mapping manner usually includes direct mapping and set-associative mapping.

In the direct mapping manner, a block in the main memory can be mapped only to a specific block in the cache. For example, assuming that the main memory has 16 blocks and the cache has four blocks, block 0, block 4, block 8, and block 12 in the main memory can be mapped only to block 0 in the cache, block 1, block 5, block 9, and block 13 in the main memory can be mapped only to block 1 in the cache, . . . . The direct mapping is a simplest address mapping manner, which requires simple hardware and low costs and has a high address conversion speed. However, this manner is not sufficiently flexible, and storage space of the cache cannot be fully utilized. Because each memory block can be stored only at a fixed location in the cache, a collision is easily caused, decreasing cache efficiency. For example, if a program has to repeatedly invoke block 0 and block 4 in the main memory, an optimal manner is to copy block 0 and block 4 in the main memory to the cache at the same time. However, because block 0 and block 4 in the main memory can be copied only to block 0 in the cache, that is, other storage space in the cache cannot be occupied even when the other storage space is empty, the two blocks are continuously alternately cached to the cache, decreasing a hit rate. For ease of description, a block in the main memory may be referred to as a memory block.

In the set-associative mapping manner, the main memory and the cache are each divided into a plurality of sets, and a quantity of blocks in one set in the main memory is the same as a quantity of sets in the cache. A fixed mapping relationship exists between each block in the main memory and a number of a set in the cache, but the block in the main memory may be freely mapped to any block in the corresponding set in the cache. In other words, in this mapping manner, a memory block is stored in a fixed set, but is stored in a random block in the set. For example, the main memory is divided into 256 sets each including eight blocks, and the cache is divided into eight sets each including two blocks. Block 0, block 8, . . . in the main memory are all mapped to set 0 in the cache, and may be mapped to block 0 or block 1 in set 0 in the cache, block 1, block 9, . . . in the main memory are all mapped to set 1 in the cache, and may be mapped to block 2 or block 3 in set 1 in the cache. In the cache using the set-associative mapping manner, each set may include two, four, eight, or 16 blocks, and correspondingly, may be respectively referred to as a two-way set-associative cache, a four-way set-associative cache, an eight-way set-associative cache, or a 16-way set-associative cache. It should be noted that the "set" in this embodiment of the present disclosure may also be referred to as a "group".

In this embodiment of the present disclosure, the DRAM 125 is used as a cache of the NVM 120, and configured to cache some data blocks in the NVM 120. Therefore, data in the main memory NVM 120 also is mapped to the DRAM 125 in a mapping manner. In an actual application, the data in the NVM 120 is usually mapped to the DRAM 125 in the direct mapping manner or the set-associative mapping manner. For ease of description, in this embodiment of the present disclosure, a data block in the NVM 120 may also be referred to as a memory block, and a data block in the DRAM 125 is referred to as a cache block or a cache line. A size of one memory block may be 4 KB (kilobyte), and a size of one cache line may also be 4 KB. It may be understood that in an actual application, the size of the memory block and the size of the cache line may be set to other values. The size of the memory block may be the same as the size of the cache line.

Figure 2:
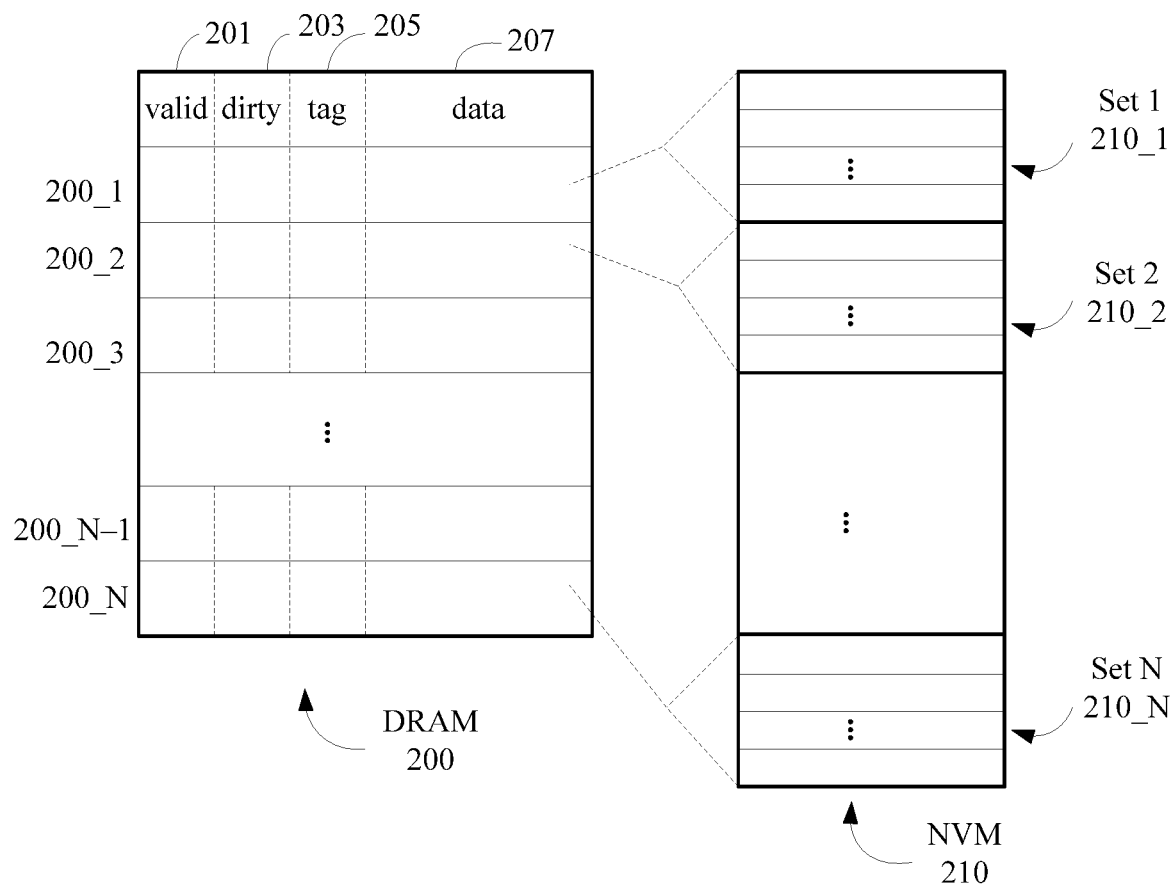
FIG. 2 is a schematic diagram of an organization structure of data in a cache according to an embodiment of the present disclosure.

FIG. 2 shows a schematic mapping between the NVM 120 and the DRAM 125 according to an embodiment of the present disclosure. As shown in FIG. 2, storage space of the NVM 120 may be divided into a plurality of different cache sets: a set 1 210_1, a set 2 210_2, . . . , and a set N 210_N. One cache entry in the DRAM 125 is allocated to each set. For example, as shown in FIG. 2, a cache entry 200_1 is a cache entry reserved for any storage address in the set 1 210_1, a cache entry 200_2 is a cache entry reserved for any storage address in the set 2 210_2. In this manner, memory blocks corresponding to all storage addresses in the set 1 210_1 may be mapped to the cache entry 200_1.

FIG. 2 further shows an organization structure of data in the DRAM 125. As shown in a DRAM organization structure 200 in FIG. 2, one cache entry (cache entry) corresponds to one line of data. In other words, one cache entry corresponds to one cache line. The DRAM 125 may include a plurality of lines, and each line may store data of a plurality of bytes. Each cache entry includes at least a valid bit 201, a dirty bit 203, a tag 205, and data 207. It may be understood that in an actual application, each cache entry may further include error correcting code (ECC) information, to ensure correctness of stored data. The tag 205 is a part of a main memory address, and used to indicate a location, in the main memory NVM 120, of a memory block to which a cache line is mapped. The data 207 is data, cached in the cache line, of the memory block.

Both the valid bit 201 and the dirty bit 203 are flag bits, and used to indicate a status of the cache line. The valid bit 201 is used to indicate whether the cache line is valid. When the valid bit indicates valid, it indicates that the data in the cache line is available. When the valid bit indicates invalid, it indicates that the data in the cache line is unavailable. The dirty bit 203 is used to indicate whether the data in the cache line is the same as data in the corresponding memory block. For example, when the dirty bit indicates dirty, it indicates that a data part (for example, the data 207 shown in FIG. 2) in the cache line is partially different from the data in the corresponding memory block. In other words, when the dirty bit indicates dirty, the cache line includes new data. When the dirty bit indicates clean, it indicates that the data in the cache line is the same as the data in the corresponding memory block. In an actual application, the dirty bit may indicate dirty or clean by using a value. For example, when the dirty bit is "1", the dirty bit indicates dirty, meaning that the cache line includes new data, when the dirty bit is "0", the dirty bit indicates clean, meaning that the data in the cache line is the same as the data in the corresponding memory block. It may be understood that the dirty bit may alternatively indicate dirty or clean by using another value. This is not limited herein.

FIG. 2 shows a schematic mapping when the direct mapping manner is used for the NVM 120 and the DRAM 125. It may be understood that in this embodiment of the present disclosure, the data in the DRAM 125 may alternatively be organized in a form of a cache set in the set-associative mapping manner. In this manner, the DRAM 125 may include a plurality of cache sets, and each cache set may include data of a plurality of lines. In other words, each cache set may include a plurality of cache entries. For example, the cache entry 200_1 and the cache entry 200_2 in the DRAM 200 shown in FIG. 2 may be used as a set. The set 1 210_1 in the NVM 210 may be mapped to the cache entry 200_1 or the cache entry 200_2 in the set.

After the data in the main memory is mapped to the cache, a set index is usually used to indicate a location, in the cache, of a cache line to which a memory block is mapped. It may be understood that in the direct mapping manner, a set index may be used to indicate a location, in the cache, of a cache line to which a memory block is mapped, in the set-associative mapping manner, a set index may be used to indicate a location, in the cache, of a set of cache lines. For example, in the foregoing embodiment, when block 0, block 8, . . . in the main memory are all mapped to set 0 in the cache, a set index of set 0 may be used to indicate a location, in the cache, of cache lines (including block 0 and block 1) of set 0.

Figure 3:
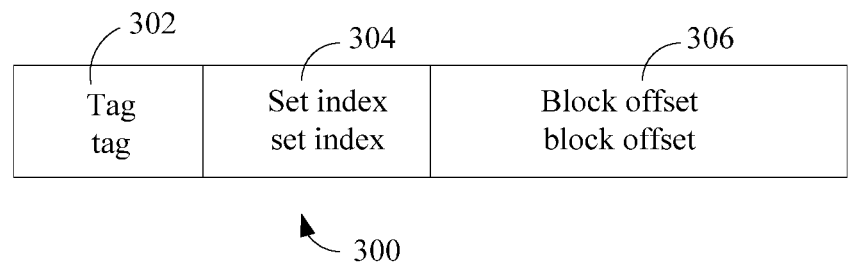
FIG. 3 is a schematic composition diagram of an address of a memory block according to an embodiment of the present disclosure.

As described above, when receiving a memory access request, the memory controller first determines whether a target address (namely, an address of a to-be-accessed memory block) in the memory access request hits the DRAM 125, to determine whether to-be-accessed data is stored in the DRAM 125. When the cache DRAM 125 receives the target address sent by the memory controller, the DRAM 125 may determine, based on a tag in the target address, whether the to-be-accessed address hits the cache. In other words, the DRAM 125 may determine, based on the tag in the target address, whether data in the address is cached in the DRAM 125. As shown in FIG. 3, the DRAM 125 may divide a target address 300 into three parts, a tag 302, a set index 304, and a block offset 306. The set index 304 is used to indicate a cache set to which a memory block that the target address 300 points to is mapped in the cache. The tag 302 is used to indicate a location, in the main memory (for example, the NVM 120), of the memory block that the target address 300 points to. The block offset 306 is used to indicate an offset location of to-be-accessed data in a cache line. In other words, the block offset 306 is used to determine a location of the to-be-accessed data in the line. In an actual application, when the cache DRAM 125 receives the target address 300 sent by the memory controller, the DRAM 125 may first determine, based on the set index 304 in the target address 300, a cache set to which the target address 300 belongs in the DRAM 125. One cache set includes at least one cache entry. In other words, one cache set includes at least one cache line. Therefore, after determining the cache set to which the target address 300 belongs, the DRAM 125 may compare a value of the tag 302 in the target address 300 with a tag bit (for example, the tag 205 in FIG. 2) in each cache entry (for example, the cache entry 200_1 and the cache entry 200_2 in FIG. 2) in the cache set that the set index 304 points to, to determine whether the target address 300 hits the DRAM 125. When the tag in the target address 300 is the same as a tag in a cache entry in the cache set, it indicates that target data to be accessed by the memory access request is cached in the DRAM 125. In this case, the memory controller may directly access the DRAM 125, and return the target data cached in the DRAM 125 to the CPU. When the tag in the target address is different from the tag in the cache entry in the cache set, it is determined that the memory access request misses the DRAM 125. In this case, the memory controller accesses the NVM 120, to obtain, from the NVM 120, the target data to be accessed by the access request. The DRAM 125 is used as a cache of the NVM 120, so that a memory access time is shortened and a memory access speed is increased while ensuring that the data in the main memory is not lost when a power failure occurs.

In an actual application, when the DRAM 125 is used as a cache of the NVM 120, tags also need to occupy relatively large storage space. For example, tags usually occupy 4 B of 64 B (Byte) that is usually a size of a cache entry. If a size of a DRAM is 16 (Gigabyte) GB, a size of tags is 1 GB. Therefore, in an actual application, tags are usually stored in a DRAM.

As described above, only some data in the NVM 120 is mapped in the DRAM 125, and a plurality of blocks in the NVM 120 may be mapped to a same block in the DRAM 125. For example, block 0, block 4, block 8, and block 12 in the NVM 120 may be mapped to block 0 in the DRAM 125, or block 0, block 8, . . . in the NVM 120 may be mapped to a cache line in set 0 in the DRAM 125. Therefore, when processing a plurality of memory access requests that can be mapped to a plurality of memory blocks in a same cache line, the memory controller 115 can only perform serial processing. For example, when request 0, request 1, and request 2 are respectively memory access requests for accessing block 0, block 4, and block 8 in the NVM 120, because block 0, block 4, and block 8 in the NVM 120 are all mapped to block 0 in the DRAM 125, the memory controller 115 can only separately process request 0, request 1, and request 2. In this case, the memory controller 115 may first obtain, from the DRAM 125, a tag of data block 0 in the DRAM 125, then compare a tag in a target address of request 0 with the tag of block 0 in the DRAM 125 to determine whether request 0 hits the DRAM 125, and obtain data from the DRAM 125 or the NVM 120 based on a hit status, to complete memory access by request 0. In addition, the memory controller 115 determines, based on a status of processing request 0, whether to update the tag of block 0 in the DRAM 125. The memory controller 115 processes request 1 only after completing memory access by request 0. In this case, the memory controller 115 compares a tag in a target address of request 1 with an updated tag of block 0 in the DRAM 125 to determine whether request 1 hits the DRAM 125, to complete memory access by request 1, and determines, based on a status of processing request 1, whether to update the tag of block 0 in the DRAM 125, . . . . Because relatively long latency is caused by reading of data from the DRAM 125, a plurality of access requests for accessing a same block in the DRAM 125 require serial processing, and a tag may be updated every time the DRAM 125 is accessed, memory access latency is relatively long.

Figure 4:
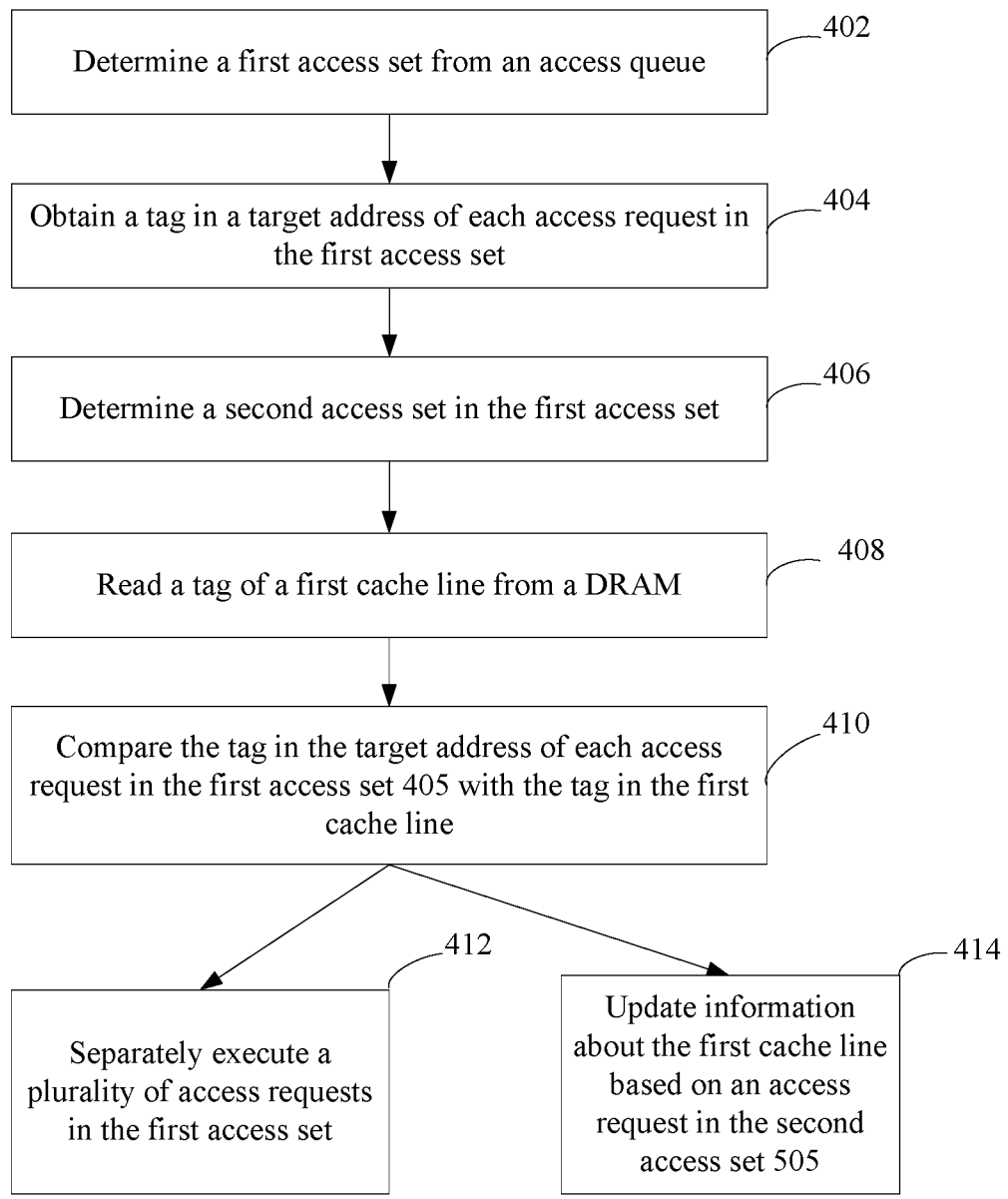
FIG. 4 is a flowchart of a memory access method according to an embodiment of the present disclosure.
Figure 5:
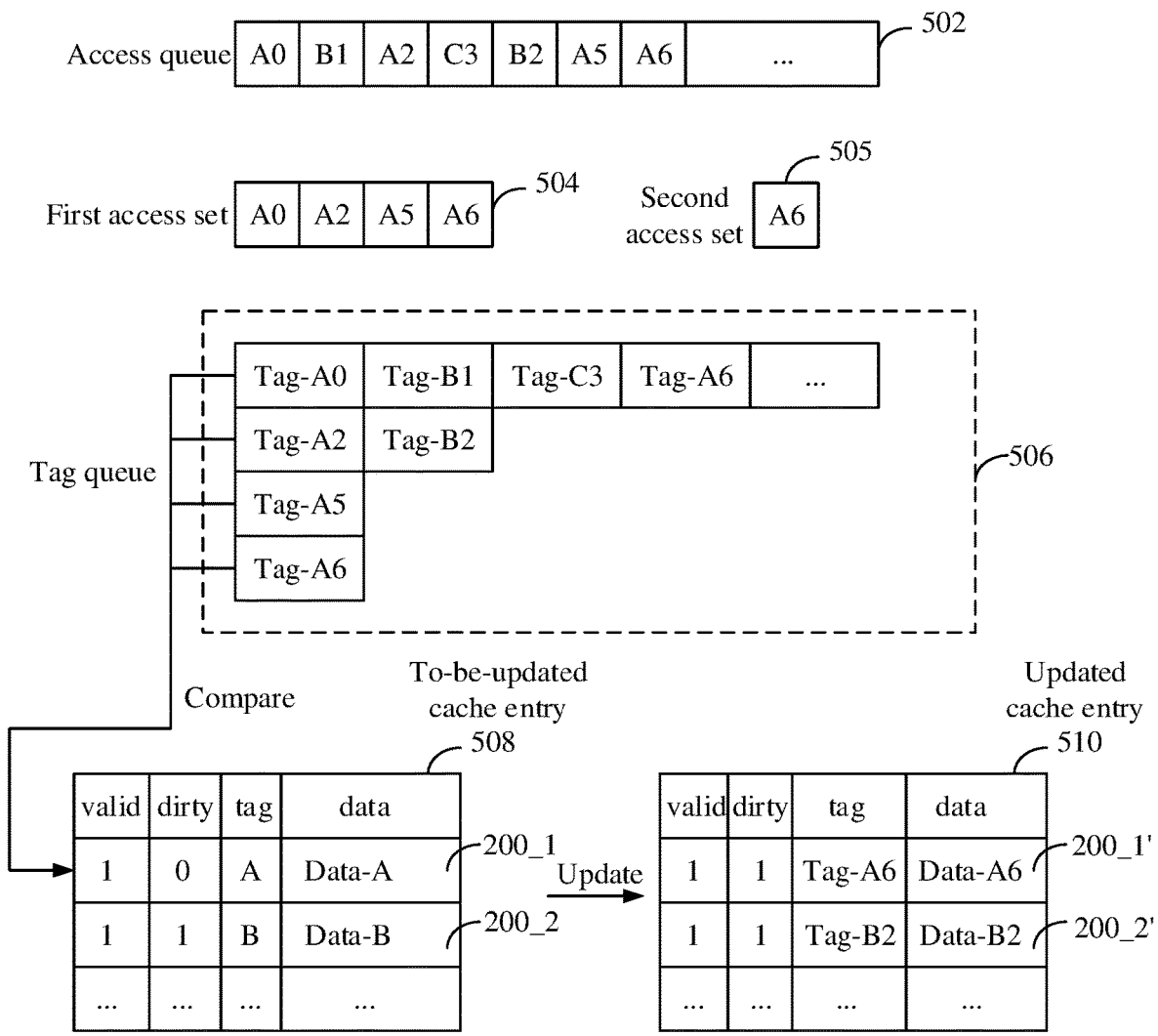
FIG. 5 is a schematic diagram of memory access according to an embodiment of the present disclosure.

An embodiment of the present disclosure provides a memory access method applied to a computer system with a hybrid memory architecture, to reduce memory access latency and increase a memory access speed. The memory access method provided in this embodiment of the present disclosure is described below in detail with reference to FIG. 4 and FIG. 5 by using the computer system shown in FIG. 1 as an example. FIG. 4 is a flowchart of a memory access method according to an embodiment of the present disclosure. FIG. 5 is a schematic diagram of memory access according to an embodiment of the present disclosure. As shown in FIG. 4, the method may include the following steps.

In step 402, the memory controller 115 determines a first access set from an access queue. The access queue caches a plurality of memory access requests, and the first access set also includes a plurality of memory access requests. For example, as shown in FIG. 5, an access queue 502 may include memory access requests, A0, B1, A2, C3, B2, A5, A6, and the like. The memory controller 115 may determine a first access set 504, A0, A2, A5, and A6 from the access queue 502. In this embodiment of the present disclosure, the plurality of access requests in the first access set need to meet two conditions, 1) All target addresses in the memory access requests A0, A2, A5, and A6 in the first access set 504 have a same set index. In other words, A0, A2, A5, and A6 in the first access set 504 are all memory access requests for accessing a same cache set. 2) To ensure correctness of accessed data, tags in the plurality of memory access requests in the first access set 504 are different from each other. In other words, the first access set 504 does not include two memory access requests for accessing a same memory block. Based on the two conditions, in this step, the memory controller 115 may determine the first access set 504 based on set index bits and tag bits in target addresses of the access requests in the access queue.

As described above, one cache set may include one or more cache entries. For ease of description, in this embodiment of the present disclosure, description is provided by using an example in which one cache set includes one cache entry. In this embodiment of the present disclosure, it is assumed that the memory controller 115 determines, based on set index bits in target addresses of A0, A2, A5, and A6, that A0, A2, A5, and A6 are all access requests for accessing a same cache set. For example, the memory controller 115 determines, based on the set index bits in the target addresses of A0, A2, A5, and A6, that all memory blocks to be accessed by A0, A2, A5, and A6 have a mapping relationship with a cache line corresponding to the cache entry 200_1. In addition, it is assumed that the memory controller 115 determines, based on tag bits in the target addresses of A0, A2, A5, and A6, that tags of A0, A2, A5, and A6 are different from each other. Then the memory controller 115 may determine that the first access set 504 includes the memory access requests A0, A2, A5, and A6. In this manner, the first access set 504 includes a plurality of access requests that point to a same cache line and that are used to access different memory blocks. The same cache line that the plurality of access requests in the first access set 504 point to has a mapping relationship with the memory blocks to be accessed by the plurality of access requests. For ease of description, in this embodiment of the present disclosure, the cache line corresponding to the cache entry 200_1 is referred to as a first cache line. Similarly, if B1 and B2 are memory access requests for accessing a same cache set, and B1 and B2 are not access requests for accessing a same memory block, the memory controller 115 may also determine the access requests B1 and B2 as an access set (not shown in FIG. 5). It should be noted that unless otherwise stated, all access requests in this embodiment of the present disclosure are memory access requests.

In step 404, the memory controller 115 obtains a tag in a target address of each access request in the first access set. For example, as shown in FIG. 5, the memory controller 115 may obtain a tag in each access request based on the target addresses of the access requests in the first-level memory access set 504. In an embodiment, the memory controller 115 obtains a tag Tag_A0 from the access request A0, a tag Tag_A2 from the access request A2, a tag Tag_A5 from the access request A5, and a tag Tag_A6 from the access request A6. In an actual application, the memory controller 115 may obtain a tag queue 506 based on the obtained tags in the access requests.

In step 406, the memory controller 115 determines, in the first access set 504, a second access set 505 including an access request for updating the first cache line. An update of the first cache line not only includes update of data (namely, data in a data bit in the foregoing cache entry) in the first cache line, but also includes update of metadata information such as a valid bit valid, a tag, and a dirty bit dirty (as shown in FIG. 2) in the first cache line. In this embodiment of the present disclosure, because the access requests in the first access set are used to access different memory blocks, and all these different memory blocks are mapped to a same cache line, even though the cache line is updated every time one memory access request is processed, a probability that a subsequent access request hits the cache is not increased. In addition, if the cache line is updated once based on each memory access request, a time for executing a memory access request is increased. Therefore, in this embodiment of the present disclosure, to reduce latency of updating a cache line, the memory controller 115 does not update the first cache line based on each access request in the first access set 504, but updates the first cache line based on some memory access requests in the first access set 504. In an embodiment, the memory controller 115 may determine the second access set 505 in the first access set 504. The second access set 505 includes at least one access request in the first access set 504, but does not include all the access requests in the first access set 504. For example, in a case, the second access set 505 may include only any access request, for example, A0 or A6 in the first access set 504. In another case, the second access set may include a plurality of access requests, for example, A2 and A5, in the first access set 504. It may be understood that fewer access requests included in the second access set 505 means a smaller quantity of times of updating the first cache line and shorter access latency. In an actual application, one access request may be determined in the first access set 504 as an access request for updating the first cache line. In other words, the second access set 505 usually may include only one access request.

In an embodiment, in a direct mapping manner, the memory controller 115 may update the first cache line based on the last access request in the first access set 504. For example, in the first access set 504 shown in FIG. 5, the memory controller 115 may determine the access request A6 as an access request for updating the first cache line recorded in the cache entry 200_1. In an actual application, the memory controller 115 may further determine any access request in the first access set 504 as an access request for updating the first cache line.

in a set-associative mapping manner, because one cache set includes a plurality of cache entries, namely, one cache set includes a plurality of cache lines, and the access set determined by the memory controller 115 in step 402 may include memory access requests for accessing a plurality of cache entries in a same cache set, in this step, the memory controller 115 determines access requests respectively used to update different cache entries. For example, if the access set determined by the memory controller 115 in step 402 includes a plurality of access requests for accessing a first cache entry and a second cache entry, where the first cache entry and the second cache entry belong to a same cache set, in step 406, the memory controller 115 may determine one of a plurality of access requests for accessing the first cache entry to update the first cache entry and may determine one of a plurality of access requests for accessing the second cache entry to update the second cache entry.

In step 408, the memory controller 115 reads a tag of the first cache line from the DRAM 125. As described above, in the direct mapping manner, one cache entry corresponds to one cache line cache line. Because tags are also stored in a DRAM, when determining whether a memory access request hits a cache (for example, the DRAM 125 shown in FIG. 1), the memory controller 115 first reads a tag of a cache line from the DRAM 125, to compare the tag in the cache line with a tag in the access request. In an embodiment, when the memory access request hits a cache entry, the memory controller 115 may obtain a tag in a corresponding cache line from the cache entry. For example, if A0, A2, A5, and A6 in the first access set 504 are all memory access requests for accessing the same cache entry 200_1, in this step, the memory controller 115 may read a tag recorded in the cache entry 200_1 from the DRAM 125, to compare the tag recorded in the cache entry 200_1 with tags in the access requests. For ease of description, in this embodiment of the present disclosure, the cache line recorded in the cache entry 200_1 is referred to as the first cache line.

In step 410, the memory controller 115 compares the tag in the target address of each access request in the first access set 405 with the tag of the first cache line, to determine whether each access request in the first access set 405 hits the cache. For example, as shown in FIG. 5, the memory controller 115 may separately compare Tag-A0, Tag-A2, Tag-A5, and Tag-A6 with the tag recorded in the cache entry 200_1. If a tag in an access request is the same as the tag in the cache entry 200_1, it indicates that the access request hits the cache. If a tag in an access request is different from the tag in the cache entry 200_1, it indicates that the access request misses the cache. For example, if the tag Tag-A0 in A0 is the same as the tag in the cache entry 200_1, the memory controller 115 determines that the access request A0 hits the DRAM 125, if the tag Tag-A1 in A1 is different from the tag in the cache entry 200_1, the memory controller 115 determines that the access request A1 misses the DRAM 125.

In an actual application, during tag comparison, a tag in an access request for updating the tag of the first cache line may be compared with the tag of the first cache line at last. For example, if in step 406, the memory controller 115 determines that the access request A6 is an access request for updating the tag in the cache entry 200_1, in this step, the memory controller 115 may first separately compare tags in A0, A2, and A5 with the tag in the cache entry 200_1, and then compare a tag in A6 with the tag in the cache entry 200_1. In other words, in this step, the memory controller 115 may first compare a tag in an access request in the first access set 504 but not in the second access set 505 with the tag in the cache entry 200_1, and only after processing all access requests that are not used to update the cache entry 200_1, the memory controller 115 compares a tag in an access request in the second access set 505 with the tag in the cache entry 200_1. This manner does not affect a probability that another access request not in the second access set hits the first cache line. In other words, this memory access method does not reduce a cache hit rate. In addition, cached data in the first-level memory can be effectively replaced by updating the information about the first cache line based on the access request in the second access set, to increase a probability that a subsequent access request hits the first-level memory.

When comparing tags to determine whether an access request hits the DRAM 125, first, a determination is made as to whether the valid bit in the first cache line indicates that data in the first cache line is valid. When the valid bit in the first cache line indicates that the data in the first cache line is invalid, it may be directly determined that the access request misses the DRAM 125. Only when determining that the valid bit in the first cache line indicates that the data in the first cache line is valid, the memory controller 115 determines, based on a tag comparison result, whether the access request hits the DRAM 125. For example, before comparing a tag in an access request (for example, a third access request) in the second access set 505 with the tag of the first cache line, if the memory controller 115 determines that the valid bit in the first cache line indicates that the first cache line is currently in an invalid state, the memory controller 115 may directly determine that the access request misses the DRAM 125.

In step 412, the memory controller 115 separately executes the plurality of access requests in the first access set. In an embodiment, the memory controller 115 may process the access requests separately based on whether the access requests in the first access set hit the DRAM 125. In this embodiment of the present disclosure, to increase a cache hit rate, an access request in the first access set 504 but not in the second access set 505 may be first processed based on an access type and a hit status of the access request in the first access set 504 but not in the second access set 505, and then an access request in the second access set is processed. In this manner, cached data in the first-level memory can be effectively replaced, to increase a probability that a subsequent access request hits the first-level memory.

In this embodiment of the present disclosure, the access requests in the first access set 504 may be processed in the following cases, as shown in FIG. 6. For access requests not in the second access set 505, in a case, when determining that an access request misses the DRAM 125, the memory controller 115 may send the access request to the NVM 125 for processing. For example, if the memory controller 115 determines that the access request A1 misses the DRAM 125, the memory controller 115 may send the access request A1 to the NVM controller 116 for processing, and the NVM controller 116 executes the access request A1. For example, the NVM controller 116 reads data from the NVM 120 or writes data to the NVM 120 based on a target address in the access request A1. In another case, when determining that an access request hits the DRAM 125, the memory controller 115 may perform a different operation on the access request based on a type of the access request. In an embodiment, when the access request hits the DRAM 125 and the request is a read request, the memory controller 115 may send the request to the DRAM 125, to read data from the DRAM 125. For example, if the memory controller 115 determines that the access request A0 hits the DRAM 125, the memory controller 115 may send the access request A0 to the DRAM controller 118, and the DRAM controller 118 may read data from the DRAM 125 based on a target address in the access request A0. When the access request hits the DRAM 125 and the access request is a write request, the memory controller 115 may send the access request to the NVM 120, to directly write to-be-written data carried in the access request to a memory block that is in the NVM 120 and that corresponds to the first cache line. It should be noted that because in this embodiment of the present disclosure, the first cache line is not updated based on another access request in the first access set but not in the second access set 505, and in this case, the access request has modified data in the memory block that is in the NVM and that corresponds to the first cache line, the memory controller 115 may set valid bit information read by the memory controller 115 in the first cache line to invalid, to indicate that the information about the first cache line is unavailable.

As described above, in the memory access method provided in this embodiment of the present disclosure, for a second access request that does not belong to the second access set, because the first cache line is not updated based on the second access request, even when the second access request is a write request that hits the first-level memory, the memory controller can still directly send the second access request to the second-level memory for processing, so that to-be-written data in the second access request can be directly written to the second-level memory. However, in this case, the to-be-written data is written to the first-level memory, and then the data is written from the first-level memory to the second-level memory during subsequent persistence of data in the first-level memory. It can be learned that according to the memory access method of this application, during processing of an access request for which the first cache line does not need to be updated, to-be-written data may be directly written to the second-level memory, thereby reducing a quantity of times of data writing.

As shown in FIG. 6, the memory controller 115 may also process an access request in the second access set 505 in the following cases. For ease of description, description is provided by using an example in which the second access set 505 includes only A6. In a case, that is, when determining that A6 hits the DRAM 125, the memory controller 115 may directly send the access request A6 to the DRAM 125, to read data from the DRAM 125 or write to-be-written data to the DRAM 125. In another case, that is, when determining that A6 misses the DRAM 125, the memory controller 115 performs a different operation on the access request A6 based on a request type of A6. In an embodiment, when determining that A6 is a read request and A6 misses the DRAM 125, the memory controller 115 may send A6 to the NVM 120, to read data from a corresponding memory block in the NVM 120 based on a target address carried in A6. When the memory controller 115 determines that A6 is a write request and A6 misses the DRAM 125, because A6 is a request for updating the first cache line, the memory controller 115 may send A6 to the DRAM, to write data carried in A6 to the DRAM 125, to reduce latency of processing A6.

In an actual application, for each access request in the first access set 504, after determining whether the access request hits the DRAM 125, the memory controller 115 may immediately send, based on a hit status of the access request, the access request to the DRAM controller 118 or the NVM controller 116 for processing. In other words, for any access request in the first access set 504, the memory controller 115 may perform step 412 immediately after performing step 410.

In step 414, the memory controller 115 updates the information about the first cache line based on an access request in the second access set 505. In an embodiment, the memory controller 115 may update the information about the first cache line based on a request type of the access request in the second access set 505 and whether the access request in the second access set 505 hits the cache. As described above, to reduce access latency, in this embodiment of the present disclosure, the first cache line is updated based only on some access requests in the first access set. In this embodiment of the present disclosure, updating the information about the first cache line includes updating the tag of the first cache line. In an embodiment, if a first access request is an access request in the second access set, the tag of the first cache line may be updated based on a tag in a target address in the first access request. In an actual application, the updating the information about the first cache line may further include updating information of at least one item of the valid bit, the dirty bit, and the data bit of the first cache line.

In an embodiment, for an access request that is not used to update the tag of the first cache line, for example, for access requests in the first access set 504 but not in the second access set 505 shown in FIG. 5, the memory controller 115 may directly send, respectively based on comparison results, the access requests to the DRAM 125 or the NVM 120 for processing, without updating the first cache line based on the access requests. In other words, even when another access request not in the second access set 505 includes a write request or includes an access request that misses the first-level memory, the memory controller 115 does not update the first cache line based on the access request not in the second access set 505. For an access request that is in the second access set 505, that is determined in step 406, and that is used to update the first cache line, the memory controller 115 updates the first cache line based on a comparison result and a request type of the access request. For example, if in step 406, the memory controller 115 determines that A6 is an access request used to update the first cache line, after comparing Tag-A0, Tag-A2, Tag-A5, and Tag-A6 with the tag in the cache entry 200_1, the memory controller 115 updates the cache entry 200_1 based only on a request type of A6 and a result of comparison between Tag-A6 and the tag in the cache entry 200_1. As shown in FIG. 5, assuming that a value of the tag bit in the cache entry 200_1 before comparison is A, after Tag-A0, Tag-A2, Tag-A5, and Tag-A6 are compared with the tag in the cache entry 200_1, the cache entry 200_1 is updated based only on a result of comparison between Tag-A6 and the tag in the cache entry 200_1. A tag value in an updated cache entry 200_1' is Tag-A6. For details, refer to a to-be-updated cache entry 508 and an updated cache entry 510 in FIG. 5.

If in step 406, the memory controller 115 determines that the second access set 505 includes a plurality of access requests, in this step, the memory controller 115 separately updates the information about the first cache line based on the plurality of access requests in the second access set 505. For example, if in step 406, the memory controller 115 determines that A5 and A6 are access requests used to update the first cache line, in this step, the memory controller 115 update the first cache line twice. In an embodiment, the memory controller 115 may first update the cache entry 200_1 based on a request type of A5 and a result of comparison between Tag-A5 and the tag in the cache entry 200_1. For example, an updated cache entry 200_1 is a cache entry 200_1'. Then the memory controller 115 compares Tag-A6 with a tag in the cache entry 200_1', and further updates the cache entry 200_1' based on a request type of A6 and a result of comparison between Tag-A6 and the tag in the cache entry 200_1'.

Cases in which the memory controller 115 updates the first cache line cache entry 200_1 based on an access request in the second access set 505 are described below in detail with reference to FIG. 7. It should be noted that all cases shown in FIG. 7 occur when the valid bit in the first cache line indicates that the data in the first cache line is valid. For ease of description, A6 is still used as an example for description. As shown in FIG. 7, in a first case, when A6 is a read request and hits the DRAM 125, the memory controller 115 does not need to update the information about the first cache line. In a second case, when A6 is a read request and misses the DRAM 125, the memory controller 115 writes, to the DRAM 125, data that is read from the NVM 120 based on A6. In other words, the memory controller 115 may replace the cache line of the cache entry 200_1 in the DRAM 125 with a cache line that is read from the NVM 120 based on A6. In addition, the memory controller 115 updates the tag bit in the first cache line based on a target address carried in A6, for example, update the tag bit in the cache entry 200_1 bit to Tag-A6. The memory controller 115 further sets the dirty bit in the first cache line to a first flag (for example, "0") to indicate that the data in the first cache line is the same as data in a corresponding memory block in the NVM 120. In a third case, when A6 is a write request and hits the DRAM 125, the memory controller 115 may write to-be-written data carried in A6 to the DRAM 125, for example, update the data bit in the cache entry 200_1 to data Data-A6 carried in A6. In addition, the memory controller 115 may set the dirty bit in the first cache line to a second flag (for example, "1") to indicate that the data in the first cache line is different from data in a corresponding memory block in the NVM 120. In this case, because Tag-A6 in A6 is the same as the tag of the first cache line, the memory controller 115 does not need to update the tag of the first cache line. In a fourth case, when A6 is a write request and A6 misses the DRAM 125, the memory controller 115 updates the tag of the first cache line based on Tag-A6 in A6. In addition, the memory controller 115 may write to-be-written data carried in A6 to the DRAM 125, for example, update the data bit in the cache entry 200_1 to data Data-A6 carried in A6. The memory controller 115 may set the dirty bit in the first cache line to a second flag, for example, set the dirty bit in the cache entry 200_1 to 1, to indicate that the data in the first cache line is different from data in a corresponding memory block in the NVM 120.

It may be understood that, to ensure correctness of data, in this embodiment of the present disclosure, if a current dirty bit of the first cache line indicates that data cached in the first cache line is new data, before the information about the first cache line is updated based on A6, the data cached in the first cache line is first written to the NVM 120.

In this embodiment of the present disclosure, because the memory controller 115 compares tags in a plurality of access requests for accessing a same cache line in the DRAM 125 with a tag of the cache line in a centralized manner, when processing the plurality of access requests, the memory controller 115 reads the tag of the cache line from the DRAM 125 only once to complete comparison with the tags of the plurality of access requests, thereby reducing a quantity of times of reading the tag of the first cache line from the DRAM 125, shortening memory access latency, and improving memory access efficiency. Further, in this embodiment of the present disclosure, for the plurality of access requests for accessing the same cache line, the information about the cache line is updated based only on some of the access requests, rather than based on whether each access request hits the cache, thereby reducing an update time of the cache line. Therefore, the memory access method provided in this embodiment of the present disclosure can further shorten access latency of a memory access request.

To describe technical effects of the memory access method provided in this embodiment of the present disclosure more clearly, using FIG. 5 as an example, the following briefly compares a memory access method in the prior art with the memory access method provided in this embodiment of the present disclosure. A person in the art may know that in the prior art, when the memory controller 115 processes memory access requests A0, B1, A2, C3, B2, A5, and A6 shown in FIG. 5, assuming that A0, A2, A5, and A6 are all memory access requests used to access a first cache line (for example, the cache entry 200_1) and B1 and B2 are both memory access requests used to access a second cache line (for example, the cache entry 200_2), the memory controller 115 first reads a tag in the cache entry 200_1 from the DRAM 125, and compares Tag-A0 with the tag in the cache entry 200_1 to determine whether A0 hits the DRAM 125. If A0 misses the DRAM 125, the memory controller 115 accesses the NVM based on an address in A0, and updates the tag in the cache entry 200_1 in the DRAM 125 to Tag-A0. Then the memory controller 115 processes the access request B1. In an embodiment, the memory controller 115 reads a tag in the cache entry 200_2 from the DRAM 125, and compares Tag-B1 with the tag in the cache entry 200_2 to determine whether B1 hits the DRAM 125. Then the memory controller 115 starts to process the access request A2. In an embodiment, the memory controller 115 reads the tag in the cache entry 200_1 from the DRAM 125 again (in this case, a value of the tag in the cache entry 200_1 is Tag-A0), and compares Tag-A2 with Tag-A0 to determine whether A2 hits the DRAM 125. If A2 is a write request or A2 misses the DRAM 125, the memory controller 115 updates the tag in the cache entry 200_1 again based on A2.

However, according to the method provided in this embodiment of the present disclosure, after obtaining the first access set 504 (including the access requests A0, A2, A5, and A6), the memory controller 115 reads the tag in the cache entry 200_1 from the DRAM 125, and compares tags in the access requests in the first access set 504 with the tag in the cache entry 200_1 in a centralized manner. In an embodiment, the memory controller 115 may separately compare Tag-A0, Tag-A2, Tag-A5, and Tag-A6 with the tag in the cache entry 200_1 to determine whether the access requests A0, A2, A5, and A6 hit the DRAM 125, thereby reducing a quantity of times of reading the tag in the cache entry 200_1 from the DRAM 125. In addition, the memory controller 115 updates the tag in the cache entry 200_1 based only on whether A6 hits the cache. In other words, the memory controller 115 determines, based only on a request type of A6 and whether A6 hits the cache, whether to replace the cache line in the cache entry 200_1, thereby reducing an update time of the cache line. Therefore, compared with the memory access method in the prior art, the memory access method provided in this embodiment of the present disclosure can shorten access latency of a memory access request and improve memory access efficiency.

Further, when the memory controller 115 processes the access requests in the first access set according to the memory access method provided in this embodiment of the present disclosure, because the memory controller 115 only sends, respectively based on whether the access requests hit the DRAM 125, the access requests to the DRAM 125 or the NVM 120 for processing, after updating the information about the first cache line based on the access request in the second access set, the memory controller 115 can immediately process an access request in a next access set (for example, the access set including the access requests B1 and B2). The memory controller 115 can process the access request in the next access set without waiting completion of processing respectively performed by the DRAM 125 and the NVM 120 on the access requests in the first access request, for example, waiting completion of writing data to the DRAM 125 or the NVM 120 based on an access request in the first access set, thereby further improving the memory access efficiency.

Figure 8:
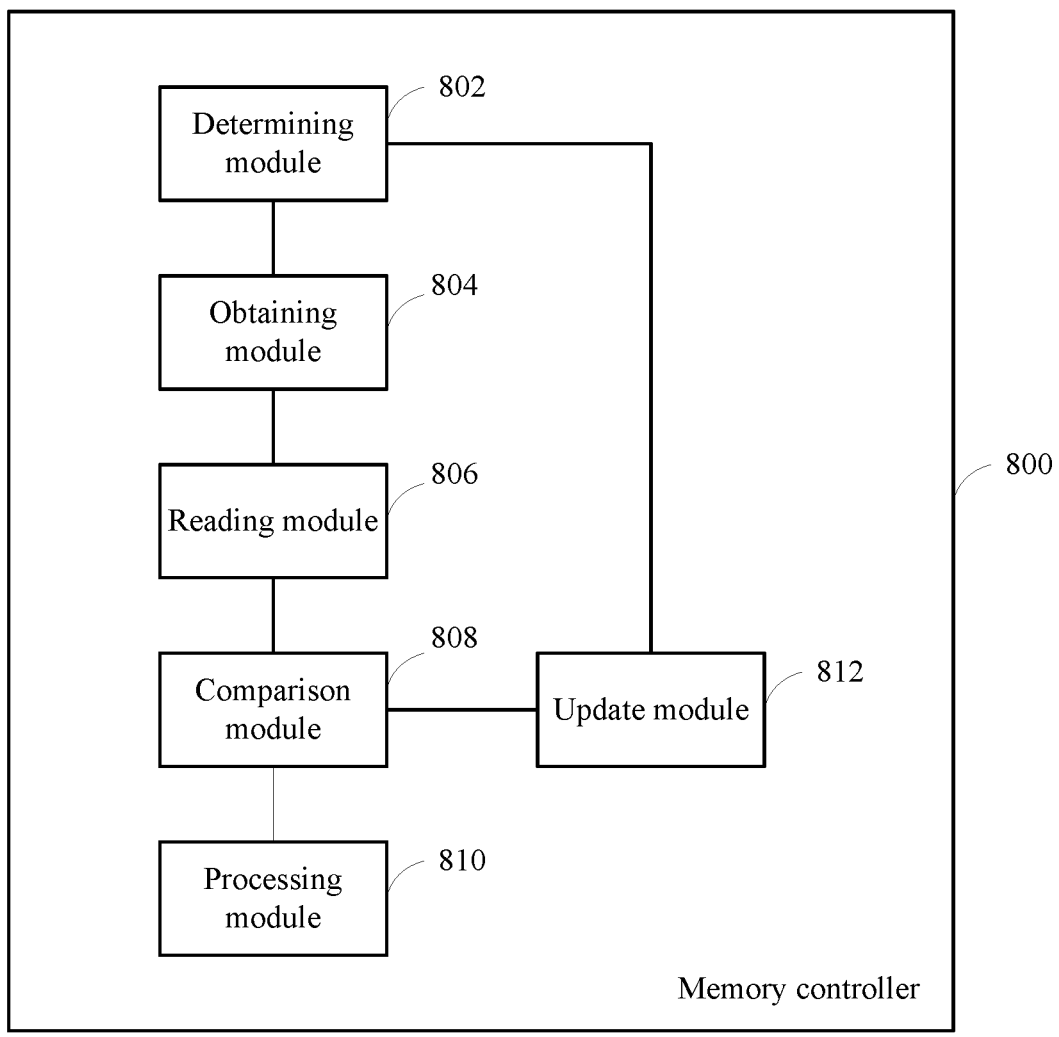
FIG. 8 is a schematic structural diagram of a memory controller according to an embodiment of the present disclosure.

FIG. 8 is a schematic structural diagram of a memory controller according to an embodiment of the present disclosure. The memory controller shown in FIG. 8 may be the memory controller 115 in the computer system shown in FIG. 1. As shown in FIG. 8, the memory controller 800 may include the following modules.

A determining module 802 is configured to determine a first access set from an access queue. The access queue caches a plurality of memory access requests, and the first access set also includes a plurality of memory access requests.

An obtaining module 804 is configured to obtain a tag in a target address of each access request in the first access set. For example, as shown in FIG. 5, the memory controller 115 may obtain a tag in each access request based on target addresses of the access requests in the first-level memory access set 504. In an embodiment, the memory controller 115 obtains a tag Tag_A0 from the access request A0, a tag Tag_A2 from the access request A2, a tag Tag_A5 from the access request A5, and a tag Tag_A6 from the access request A6.

The determining module 802 is further configured to determine, in the first access set 504, a second access set 505 including an access request for updating a first cache line. The second access set 505 includes at least one access request in the first access set 504, but does not include all the access requests in the first access set 504. In an embodiment, the memory controller 115 may determine any access request in the first access set 504 as an access request for updating the first cache line. It may be understood that fewer access requests included in the second access set 505 means a smaller quantity of times of updating the first cache line and shorter access latency. In an actual application, one access request may be determined in the first access set 504 as an access request for updating the first cache line. In other words, the second access set 505 usually may include only one access request. For example, the memory controller 115 may update the first cache line based on the last access request in the first access set 504. It may be understood that in a set-associative mapping manner, the memory controller 115 separately determines access requests used to update different cache entries.

A reading module 806 is configured to read a tag of the first cache line from the DRAM 125. As described above, tags are also stored in the DRAM. Therefore, when determining whether a memory access request hits a cache (for example, the DRAM 125 shown in FIG. 1), the memory controller 115 first reads a tag of a cache line from the DRAM 125, to compare the tag in the cache line with a tag in the access request. For example, if A0, A2, A5, and A6 in the first access set 504 are all memory access requests for accessing the same cache entry 200_1, the memory controller 115 may read a tag recorded in the cache entry 200_1 from the DRAM 125, to compare the tag recorded in the cache entry 200_1 with tags in the access requests.

A comparison module 808 is configured to compare the tag in the target address of each access request in the first access set 405 with the tag of the first cache line, to determine whether each access request in the first access set 405 hits the cache. For example, if a tag in an access request is the same as the tag of the first cache line, it indicates that the access request hits the cache, if a tag in an access request is different from the tag of the first cache line, it indicates that the access request misses the cache.

In an actual application, during tag comparison, a tag in an access request for updating the tag of the first cache line may be compared with the tag of the first cache line at last.

In an embodiment, the comparison module 808 may first compare a tag in a target address of another access request in the first access set but not in the second access set with the tag of the first cache line to determine whether the another access request hits the first-level memory. Then the comparison module 808 compares a tag in a target address of the access request in the second access set with the tag of the first cache line to determine whether the access request in the second access set hits the first-level memory.

It should be noted that during comparison, the comparison module 808 may first determine, based on a valid bit in the first cache line, whether an access request hits the cache. In an embodiment, when the valid bit in the first cache line indicates that the first cache line is invalid, the comparison module 808 may directly determine that the access request misses the first cache line. Only when the valid bit in the first cache line indicates that the first cache line is valid, the comparison module 808 compares a tag in the access request with the tag of the first cache line to determine whether the access request hits the first cache line. For example, during comparison to determine whether a third access request in the second access set hits the cache, if the first cache line is in an invalid state, the comparison module 808 may directly determine that the third access request misses the first-level memory.

A processing module 810 is configured to separately execute the plurality of access requests in the first access set. In an embodiment, the memory controller 115 may process the access requests separately based on whether the access requests in the first access set hit the DRAM 125. In this embodiment of the present disclosure, to increase a cache hit rate, an access request in the first access set 504 but not in the second access set 505 may be first processed based on an access type and a hit status of the access request in the first access set 504 but not in the second access set 505, and then an access request in the second access set is processed.

It may be understood that when executing the plurality of access requests, the processing module 810 performs processing respectively based on an operation type of each access request and whether the access request hits the DRAM 125, and during processing, further considers whether a processed access request is a memory access request for updating the first cache line. In other words, during processing, the processing module 810 determines whether the processed access request belongs to the second access set. For how the processing module 810 specifically processes the access requests, refer to the detailed description of step 412 in the method embodiment.

It should be noted that in this embodiment of the present disclosure, during processing of an access request in the second access set, in a case, that is, when a first access request in the second access set misses the first-level memory and the first access request is a write request, the processing module 810 may write to-be-written data carried in the first access request to the first-level memory.

In another case, that is, during processing of a second access request not in the second access set, when the second access request hits the first-level memory and the second access request is a write request, the processing module 810 may send the second access request to the second-level memory for processing. In addition, in this case, the processing module 810 sets the valid bit in the information about the first cache line to an invalid state, where the invalid state is used to indicate that data in the first cache line is unavailable.

An update module 812 is configured to update the information about the first cache line based on the access request in the second access set 505. In an embodiment, the memory controller 115 may update the information about the first cache line based on a request type of the access request in the second access set 505 and whether the access request in the second access set 505 hits the cache. As described above, to reduce access latency, in this embodiment of the present disclosure, the first cache line is updated based only on some access requests in the first access set. For example, the update module 812 may update the tag of the first cache line based on a tag in a target address of the first access request in the second access set. For how the update module 812 specifically updates the information about the first cache line, refer to the description of step 414 in the method embodiment.

For the memory controller 800 provided in this embodiment of the present disclosure, refer to the memory access method described in the foregoing embodiment. In an embodiment, for detailed descriptions of functions of the modules, refer to the related description of the memory controller in the foregoing embodiments (for example, the embodiments shown in FIG. 4 to FIG. 7). Details are not described herein again.

An embodiment of the present disclosure further provides a computer program product of a memory access method, including a computer readable storage medium storing program code, where an instruction included in the program code is used to perform the method process described in any one of the foregoing method embodiments. A person of ordinary skill in the art may understand that the storage medium may include any non-transitory machine readable medium capable of storing program code, such as a universal serial bus(USB)s flash drive, a removable hard disk, a magnetic disk, an optical disc, a RAM, a solid state disk (SSD), or another non-volatile memory.

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, reference may be made to relevant description of another embodiment. Features disclosed in the embodiments of the present disclosure, the claims, and the accompanying drawings may exist alone, or exist in a combination. Features described in a hardware form in the embodiments of the present disclosure may be executed by software, and vice versa. This is not limited herein.

What is claimed is:

1. A memory access method performed by a memory controller of a computer system comprising a first-level memory and a second-level memory, wherein the memory access method comprises:
    determining a first access set comprising a plurality of access requests, wherein the access requests are respectively used to access a plurality of different target addresses in a plurality of different memory blocks in the second-level memory;
    determining, based on the access requests, that the different memory blocks associated with each of the access requests map to a single cache line in the first-level memory, wherein the first-level memory is configured to cache data in the second-level memory;
    obtaining a tag in a target address of each access request in the first access set, wherein the tag in the target address of each access request indicates a location of a to-be-accessed memory block in the second-level memory;
    reading information describing the single cache line from the first-level memory, wherein the information describing the single cache line comprises a tag of the single cache line;
    comparing the tag in the target address of each access request included in the first access set with the tag of the single cache line to determine whether each access request included in the first access set hits the first-level memory;
    determining a subset of access requests included in the first access set to form a second access set; and
    updating the information describing the single cache line based only on a request type of an access request in the second access set and whether the access request in the second access set hits the first-level memory.

2. The method of claim 1, wherein comparing the tag in the target address of each access request of the first access set with the tag of the single cache line comprises:
    comparing a first tag in a first target address of a first access request included in the first access set and excluded from the second access set with the tag of the single cache line to determine whether the first access request hits the first-level memory; and
    comparing a second tag in a second target address of a second access request included in the second access set with the tag of the single cache line to determine whether the second access request in the second access set hits the first-level memory.

3. The method of claim 1, further comprising:
    determining that a first access request in the second access set misses the first-level memory and that the first access request is a write request; and
    writing to-be-written data carried in the first access request to the first-level memory.

4. The method of claim 3, wherein updating the information describing the single cache line comprises updating the tag of the single cache line based on a first tag included in a first target address of the first access request.

5. The method of claim 1, further comprising:
    sending a second access request to the second-level memory for processing in response to the second access request of the access requests hitting the first-level memory and the second access request being a write request, wherein the second access request is excluded from the second access set; and
    setting a valid bit in the information describing the single cache line to an invalid state, wherein the invalid state indicates that data in the single cache line is unavailable.

6. The method of claim 5, further comprising determining that a third access request included in the second access set misses the first-level memory based on the invalid state of the single cache line.

7. A computer system, comprising:
    a first-level memory;
    a second-level memory, wherein the first-level memory is configured to cache data in the second-level memory; and
    a memory controller connected to the first-level memory and the second-level memory and configured to:
        determine a first access set, wherein the first access set comprises a plurality of access requests, and wherein the access requests are respectively used to access a plurality of different target addresses in a plurality of different memory blocks in the second-level memory;

determine, based on the access requests, that the different memory blocks associated with each of the access requests map to a single cache line in the first-level memory;

obtain a tag in a target address of each access request in the first access set, wherein the tag in the target address of each access request indicates a location of a to-be-accessed memory block in the second-level memory;

read information describing the single cache line from the first-level memory, wherein the information describing the single cache line comprises a tag of the single cache line;

compare the tag in the target address of each access request in the first access set with the tag of the single cache line to determine whether each access request included in the first access set hits the first-level memory, determine a subset of access requests included in the first access set to form a second access set; and update the information describing the single cache line based only on a request type of an access request in the second access set and whether the access request in the second access set hits the first-level memory.

8. The computer system of claim 7, wherein the memory controller is further configured to:

compare a first tag in a first target address of a first access request included in the first access set and excluded from the second access set with the tag of the single cache line to determine whether the first access request hits the first-level memory; and compare a second tag in a second target address of a second access request included in the second access set with the tag of the single cache line to determine whether the second access request in the second access set hits the first-level memory.

9. The computer system of claim 7, wherein the memory controller is further configured to write to-be-written data carried in the first access request to the first-level memory in response to a first access request in the second access set missing the first-level memory and the first access request being a write request.

10. The computer system of claim 9, wherein the memory controller is further configured to update the tag of the single cache line based on a first tag in a first target address of the first access request.

11. The computer system of claim 7, wherein the memory controller is further configured to:

send a second access request to the second-level memory for processing in response to the second access request of the plurality of access requests hitting the first-level memory and the second access request being a write request, wherein the second access request is excluded from the second access set; and set a valid bit in the information describing the single cache line to an invalid state, wherein the invalid state indicates that data in the single cache line is unavailable.

12. The computer system of claim 11, wherein the memory controller is further configured to determine that a third access request included in the second access set misses the first-level memory based on the invalid state of the single cache line.

13. A non-transitory computer readable storage medium comprising one or more computer-executable instructions, wherein the one or more computer-executable instructions, when executed by one or more processors of a computer system comprising a first-level memory and a second-level memory, cause the computer system to:

determine a first access set, wherein the first access set comprises a plurality of access requests, and wherein the access requests are respectively used to access a plurality of different target addresses in a plurality of different memory blocks in the second-level memory;

determine, based on the access requests, that the different memory blocks associated with each of the access requests map to a single cache line in the first-level memory, wherein the first-level memory is configured to cache data in the second-level memory;

obtain a tag in a target address of each access request in the first access set, wherein the tag in the target address of each access request indicates a location of a to-be-accessed memory block in the second-level memory;

read information describing the single cache line from the first-level memory, wherein the information describing the single cache line comprises a tag of the single cache line;

compare the tag in the target address of each access request in the first access set with the tag of the single cache line to determine whether each access request hits the first-level memory;

determine a subset of access requests included in the first access set to form a second access set; and update the information describing the single cache line based only on a request type of an access request in the second access set and whether the access request in the second access set hits the first-level memory.

14. The non-transitory computer readable storage medium of claim 13, wherein the one or more computer-executable instructions, when executed by the one or more processors of the computer system, cause the computer system to:

compare a first tag in a first target address of a first access request included in the first access set and excluded from the second access set with the tag of the single cache line to determine whether the first access request hits the first-level memory; and compare a second tag in a second target address of a second access request included in the second access set with the tag of the single cache line to determine whether the second access request in the second access set hits the first-level memory.

15. The non-transitory computer readable storage medium of claim 13, wherein the one or more computer-executable instructions, when executed by the one or more processors of a computer system, further cause the computer system to:

determine that a first access request in the second access set misses the first-level memory and that the first access request is a write request; and write to-be-written data carried in the first access request to the first-level memory.

16. The non-transitory computer readable storage medium of claim 15, wherein the one or more computer-executable instructions, when executed by the one or more processors of a computer system, further cause the computer system to update the tag of the single cache line based on a first tag in a first target address of the first access request.

17. The non-transitory computer readable storage medium of claim 13, wherein the one or more computer-executable instructions, when executed by the one or more processors of a computer system, further cause the computer system to:

send a second access request to the second-level memory for processing in response to the second access request of the plurality of access requests hitting the first-level memory and the second access request being a write request, wherein the second access request is excluded from the second access set; and set a valid bit in the information describing the single cache line to an invalid state, wherein the invalid state indicates that data in the single cache line is unavailable.

18. The method of claim 1, wherein the first access set is determined from an access queue caching a plurality of memory access requests, wherein the first access set comprises a subset of the plurality of memory access requests meeting a condition.

19. The computer system of claim 7, wherein the first access set is determined from an access queue caching a plurality of memory access requests, wherein the first access set comprises a subset of the plurality of memory access requests meeting a condition.

20. The non-transitory computer readable storage medium of claim 13, wherein the first access set is determined from an access queue caching a plurality of memory access requests, wherein the first access set comprises a subset of the plurality of memory access requests meeting a condition.

* * * * *